United States Patent
Hieronimi

(10) Patent No.: US 9,322,903 B2
(45) Date of Patent: Apr. 26, 2016

(54) SYSTEM FOR DETERMINING AND/OR CONTROLLING THE LOCATION OF OBJECTS

(76) Inventor: Christian Hieronimi, Schwabmunchen (DE)

( * ) Notice: Subject to any disclaimer, the term of this patent is extended or adjusted under 35 U.S.C. 154(b) by 229 days.

(21) Appl. No.: 13/885,060

(22) PCT Filed: Nov. 10, 2011

(86) PCT No.: PCT/EP2011/069850
§ 371 (c)(1),
(2), (4) Date: Jul. 22, 2013

(87) PCT Pub. No.: WO2012/062862
PCT Pub. Date: May 18, 2012

(65) Prior Publication Data
US 2013/0293410 A1 Nov. 7, 2013

(30) Foreign Application Priority Data
Nov. 12, 2010 (DE) .......................... 10 2010 060 526

(51) Int. Cl.
| | |
|---|---|
| *G08B 5/22* | (2006.01) |
| *G08B 25/00* | (2006.01) |
| *G01S 11/02* | (2010.01) |
| *G01S 13/74* | (2006.01) |

(Continued)

(52) U.S. Cl.
CPC ................. *G01S 11/02* (2013.01); *G01S 13/74* (2013.01); *G01S 13/874* (2013.01); *G01S 5/0247* (2013.01)

(58) Field of Classification Search
CPC ....... G01S 11/02; G01S 13/74; G01S 13/874; G01S 5/0247; A61B 5/06; A61B 10/0233; A61B 19/52; A61B 19/5244; A61B 2017/00035; A61B 2017/00084; A61B 2017/00411; A61B 2017/00734; A61B 2019/448
USPC ................ 340/8.1, 10.1, 10.2, 10.34, 539.26, 340/572.1, 605, 945
See application file for complete search history.

(56) References Cited

U.S. PATENT DOCUMENTS 4,837,711 A * 6/1989 Suzuki ........................... 358/1.1
5,162,642 A * 11/1992 Akamatsu et al. ......... 250/201.6

(Continued)

FOREIGN PATENT DOCUMENTS

| | | |
|---|---|---|
| DE | 102005011126 A1 | 9/2006 |
| DE | 102006029122 A1 | 12/2007 |

(Continued)

*Primary Examiner* — Travis Hunnings
(74) *Attorney, Agent, or Firm* — Jetter & Associates, P.A.

(57) ABSTRACT

A system for determining and controlling the location of objects includes a transceiver fixedly arranged on or in the object, and a receiving antenna for receiving signals transmitted by the transceiver. A transmitting antenna transmits signals to the transceiver causing the transceiver to transmit signals. An antenna signal processing device evaluates signals received from the receiving antenna to determine a spatial position and location and a predefined identification of the transceiver relative to the receiving antenna, the object and a predefined reference point. A data processing device receives information from the antenna signal processing device about the position, location, and identification of the transceiver. In one aspect, the system is for determining the position and location of at least one transceiver relative to an object. In another aspect, the system is for determining and controlling the position and location of the object.

26 Claims, 4 Drawing Sheets

(51) Int. Cl.
*G01S 13/87* (2006.01)
*G01S 5/02* (2010.01)

(56) References Cited

U.S. PATENT DOCUMENTS

| | | | |
|---|---|---|---|
| 5,327,221 A * | 7/1994 | Saitoh et al. | 356/509 |
| 6,061,089 A * | 5/2000 | Tonkin et al. | 348/211.6 |
| 6,261,247 B1 * | 7/2001 | Ishikawa et al. | 600/587 |
| 6,424,370 B1 * | 7/2002 | Courtney | 348/143 |
| 8,089,371 B2 * | 1/2012 | Pandey | 340/8.1 |
| 8,749,351 B2 * | 6/2014 | Kim | 340/8.1 |
| 8,872,654 B2 * | 10/2014 | Komninos | 340/539.26 |
| 2003/0219157 A1 * | 11/2003 | Koide et al. | 382/173 |
| 2004/0141633 A1 * | 7/2004 | Horie | 382/103 |
| 2005/0141465 A1 * | 6/2005 | Kato et al. | 370/337 |
| 2005/0207617 A1 * | 9/2005 | Sarnoff | 382/103 |
| 2006/0039768 A1 * | 2/2006 | Ban et al. | 409/96 |
| 2007/0109128 A1 * | 5/2007 | Fujii et al. | 340/572.1 |
| 2008/0239478 A1 * | 10/2008 | Tafas et al. | 359/396 |
| 2009/0281419 A1 * | 11/2009 | Troesken et al. | 600/424 |
| 2010/0295783 A1 * | 11/2010 | El Dokor et al. | 345/158 |
| 2010/0321246 A1 * | 12/2010 | Troesken et al. | 342/463 |
| 2013/0245814 A1 * | 9/2013 | Nukui et al. | 700/228 |

FOREIGN PATENT DOCUMENTS

| | | | | |
|---|---|---|---|---|
| DE | 102006029122 A1 * | 12/2007 | | |
| DE | 102007062843 A1 | 6/2009 | | |
| EP | 1811459 | 7/2007 | | |
| EP | 1811459 A1 * | 7/2007 | | G06T 17/00 |
| EP | 2070847 | 6/2009 | | |
| WO | WO 2012025411 A1 * | 3/2012 | | |
| WO | WO 2013050597 A1 * | 4/2013 | | |

* cited by examiner

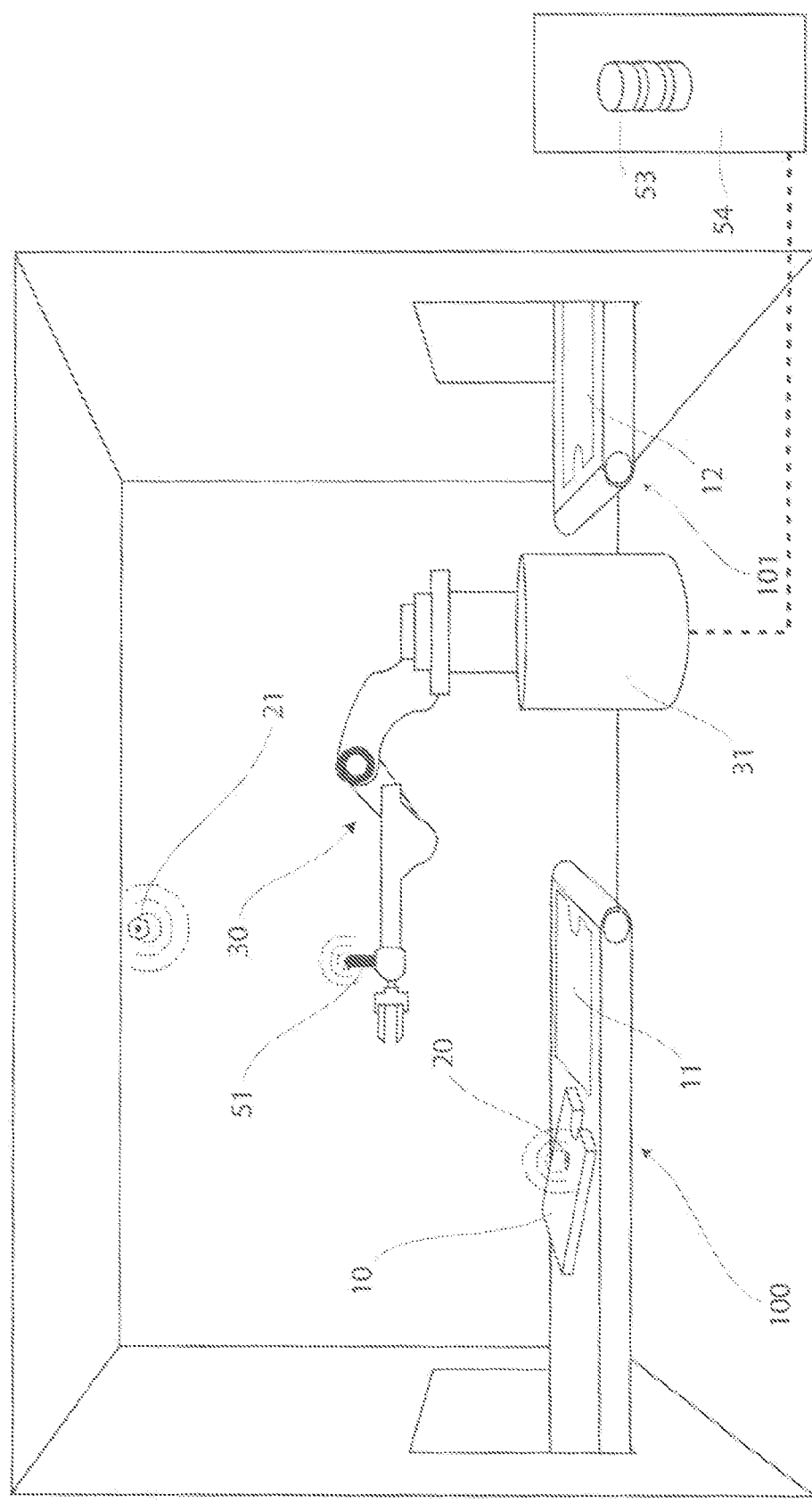

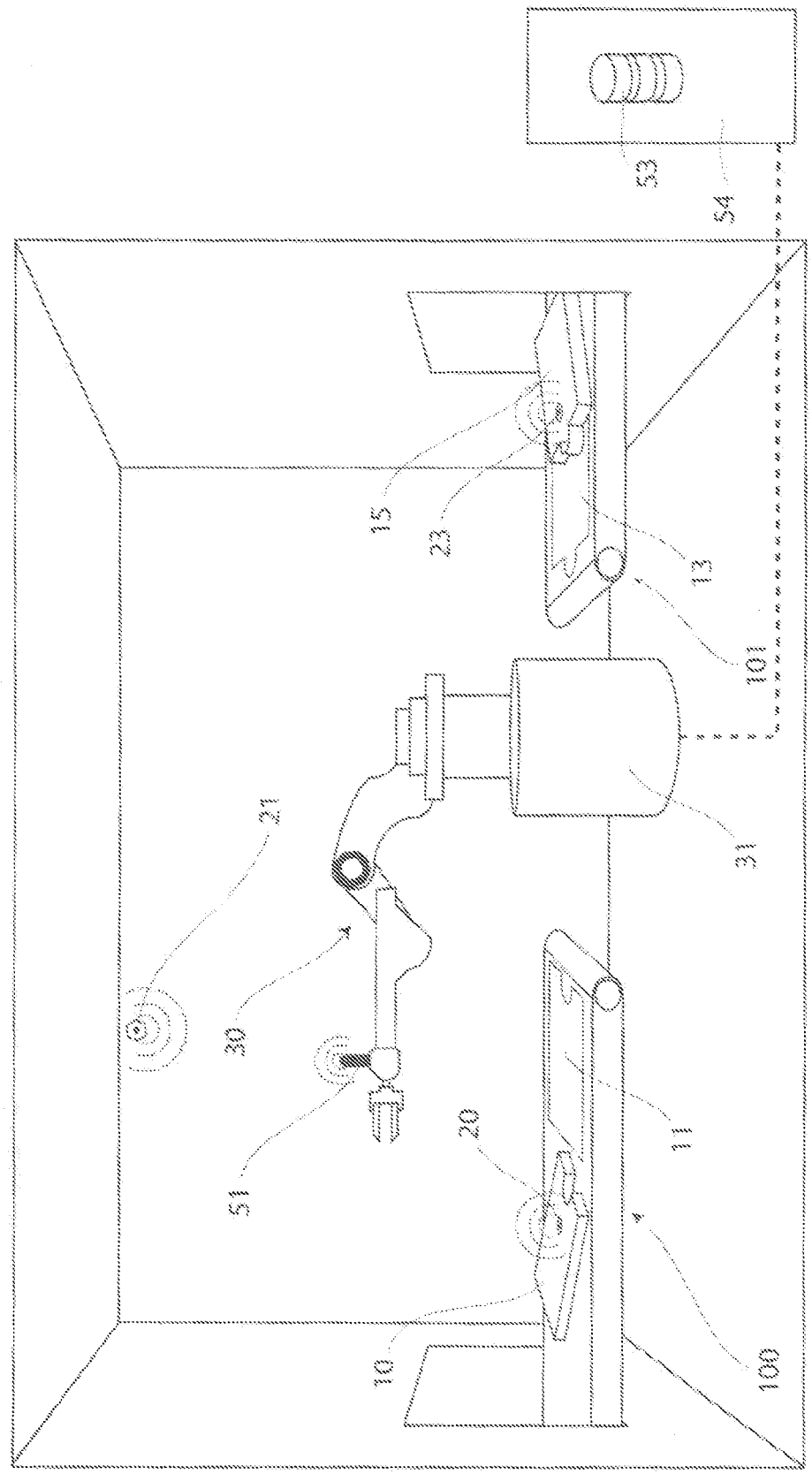

SYSTEM FOR DETERMINING AND/OR CONTROLLING THE LOCATION OF OBJECTS

CROSS REFERENCE TO RELATED APPLICATIONS

This application is a national stage application that claims priority to PCT/EP2011/069850 filed Nov. 10, 2011, which claims priority to German Patent Application DE20101060526 filed Nov. 12, 2010, both of which are incorporated herein in their entireties.

FIELD

Disclosed embodiments relate to wireless technology, more particularly to a system for determining and/or controlling the location of objects.

BACKGROUND

Determining and/or controlling the location of objects plays a major role in both the automation of production processes, for example by means of robots, as well as in controlling work pieces. In the context of such automated production processes using robots, for example, the position of an object is often crucial to ensure that a robot can quickly pick up the object, process it correctly and/or assemble it with other parts.

An object not having the location intended when the robot is programmed, cannot at all or only be picked up under difficult conditions requiring considerable time and technical effort. Manual intermediate processing or controlling action, in which no additional provisions for a 100 percent repositioning and/or identical placement of the objects prior to and after the manual processing or controlling step are taken, can therefore be integrated into the respective production only under difficult conditions.

Similarly, it is of considerable importance in such highly automated productions to at least at some points within the production provide check points by means of which it is ensured, for example, that an object assembled from multiple elements has all elements positioned correctly relative to the respective other elements. Such checks are today performed mainly by suitably installed video-based pattern recognition systems.

Although these pattern recognition systems function reliably, a considerable effort needs to be invested and moreover, these systems generally allow no error analysis, for example, in view of which of the multiple elements is inserted incorrectly or even missing, but they only identify whether an assembled object corresponds to the target pattern (OK) or not (FAIL).

High-frequency transceivers are known in the form of RFID-markers or RFID-tags (Radio Frequency Identification Tag). These markers or tags are already found in numerous applications, both in manufacturing, for example, for monitoring and/or controlling production processes, as well as in consumer goods retailing, for example, for tracing the flow of goods, for authenticity verification and the like.

DE 10 2007 062 843 A1 discloses a system with which the electromagnetic signals emitted by the RFID-tags are by means of suitable receiving systems with directional properties used to locate the tags and track their movement, respectively. DE 10 2006 029 122 A1 discloses determining the location of a medical instrument based on an RFID-tag attached thereto. These known systems provide little or no other relevant information beyond simple localization of the RFID-tag or tags, respectively.

SUMMARY

An object of embodiments of the invention is to provide a system for determining and/or controlling the location of objects which enables at least partially automated evaluation of detected position or location information. Disclosed embodiments include a system for determining and/or controlling the location of objects including a transceiver fixedly arranged on or in the object, and a receiving antenna for receiving signals transmitted by the transceiver. A transmitting antenna transmits signals to the transceiver causing the transceiver to transmit signals. An antenna signal processing device evaluates signals received from the receiving antenna to determine a spatial position and/or location and a predefined identification of the transceiver relative to the receiving antenna, the object and a predefined reference point. A data processing device receives information from the antenna signal processing device about the position, location, and identification of the transceiver.

In a first disclosed aspect, the system is for determining the position and/or location of at least one transceiver relative to an object. A data structure is provided in a memory device in data communication with the data processing device, where the data structure comprises at least a partial virtual representation of the object, and the information regarding the position and/or location of the high-frequency transceiver as well as its identification are together or combined with the virtual representation of the object stored in the memory device and a reference system of the virtual representation is defined relative to the position and/or location of the high-frequency transceiver. The virtual representation can be an electronic representation of at least a portion of the outer geometry of the object, such as a three-dimensional definition of the surface of the object, or a selection of defined points (known as points of interest) are attached at predetermined positions or are within the object, where in this case the exact outer shape of the object does not need to be known, but such a partial virtual representation of the object is sufficient.

In a second disclosed aspect, the data processing device either outputs a correctly located virtual representation with respect to the antenna or a predetermined reference point, or outputs information that allows derivation of an absolute position of the object with respect to the receiving antenna or the predetermined reference point, and/or transformation information representing a deviation of an actual position and/or location of the object from its target position and/or location.

BRIEF DESCRIPTION OF THE DRAWINGS

The features and advantages of embodiments of the invention result at least partly also from the following detailed description of various embodiments of the invention in combination with the drawings and the claims.

FIG. 3 shows a schematic illustration of a further situation of application of a second embodiment of the second disclosed aspect.

FIG. 4 shows a schematic illustration of still a further situation of application of a further embodiment of the second disclosed aspect.

DETAILED DESCRIPTION

Figure 1:
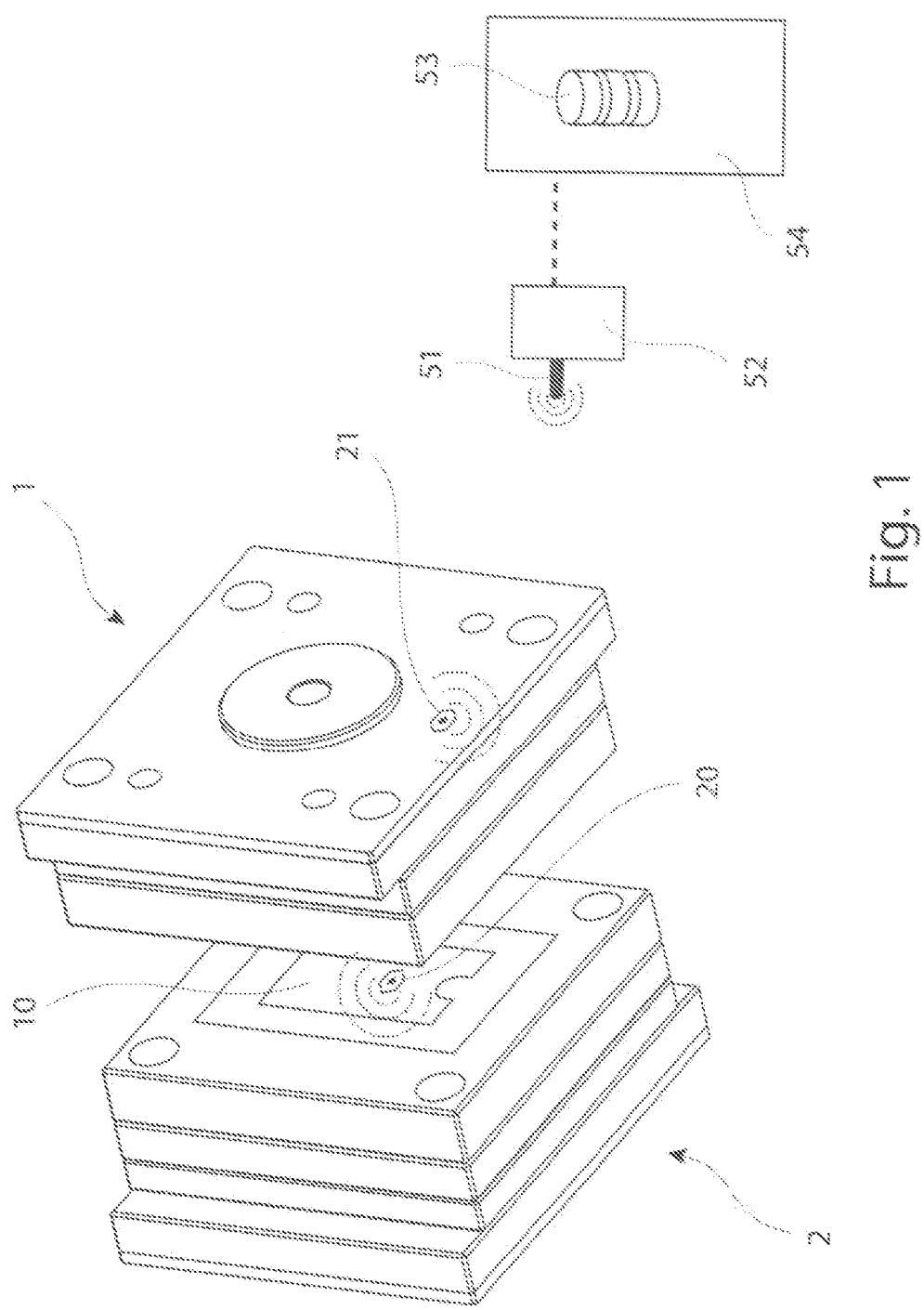
FIG. 1 shows a schematic representation of an embodiment of a first disclosed aspect in a first situation of application.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

A first disclosed aspect comprises a system for determining and/or controlling the location of at least one transceiver (which is generally referred to herein as a high-frequency transceiver which transmits high-frequency signals) relative to an object including at least one receiving antenna set up so that high-frequency signals transmitted by the high-frequency transceiver can be received by the receiving antenna. The high-frequency transceiver is fixedly arranged on or in the object in a stationary and location-fixed manner, and at least one transmitting antenna set up for transmitting high-frequency signals of at least one frequency band provided for being received by the high-frequency transceiver and thereby in turn causing the transmission of high-frequency signals from the high-frequency transceiver.

Disclosed systems comprise at least a first antenna signal processing device, which is connected to the first receiving antenna, and which is set up to evaluate the high-frequency signals received by the first receiving antenna in order to therefrom determine a spatial position and/or location as well as an identification of the respective transmitting high-frequency transceiver relative to the object and/or at least one predefined reference point, and at least one data processing device, which is at least indirectly connected to the first antenna signal processing device and receives information therefrom about the position, location, and/or identification of the respective transmitting high-frequency transceiver.

A data structure is provided in a first memory device being in data communication with the processing device comprising at least a partial virtual representation of the object, and the information regarding the position and/or location of at least one high-frequency transceiver as well as its identification are together or combined with the virtual representation of the object stored in the memory device and a reference system of the virtual representation is defined relative to the position and/or location of the high-frequency transceiver.

In this, the virtual representation can be an electronic representation of at least a portion of the outer geometry of the object, such as a three-dimensional definition of the surface of the object, or a selection of defined points (known as points of interest) are attached at predetermined positions or are within the object, where in this case the exact outer shape of the object does not need to be known, but such a partial virtual representation of the object is sufficient for the purpose of executing the invention.

In the context of this Disclosure, the position and/or location of the object or a high-frequency transceiver is understood as being any information that is suited to clearly define at least partially all degrees of freedom of the respective object, i.e., its spatial position as well as its spatial orientation, and, optionally in combination with of the virtual representation of the same, its outer contour.

A disclosed system designed according to the first aspect of the invention has the advantage that it can not only detect the spatial position and/or location of a high-frequency transceiver or its antenna, respectively, relative to the receiving antenna and/or a predefined reference point, but that it moreover can provide an accurate and at all times reproducible geometric relationship between the detected position and/or location of the high-frequency transceiver and the virtual representation of the object, in particular, also for the case that the exact position and/or location of the high-frequency transceiver was not known prior to this measurement. In this manner, the geometric reference system for the virtual representation and equally of the object is uniquely defined by means of the high-frequency transceiver.

A system according to an embodiment of the invention for determining and/or controlling the position and/or location of at last one object according to a second aspect comprises at least one receiving antenna set up so that high-frequency signals transmitted by the high-frequency transceiver can be received by the receiving antenna, the high-frequency transceiver being fixedly arranged in a stationary and location-fixed manner on or in the object intended for determining and/or controlling the position and/or location of the object, and at least one second transmitting antenna set up for transmitting high-frequency signals of at least one frequency band provided for being received by the high-frequency transceiver and thereby in turn causing the transmission of high-frequency signals by the high-frequency transceiver. Connected to the second receiving antenna is at least one second antenna signal processing device, which is set up to evaluate the high-frequency signals received from the second receiving antenna in order to therefrom determine a spatial position and/or location as well as an identification of the respective transmitting high-frequency transceiver relative to at least one second receiving antenna and/or at least one predefined reference point. Connected to the second antenna signal processing device is at least one data processing device which at least indirectly and from the latter receives transmission of information about the position, location, and/or identification of the respective transmitting high-frequency transceiver.

A data structure is provided in a first memory device, being in data communication with the data processing device, at least comprising a partial virtual representation of the object and the information regarding the position and/or location of the high-frequency transceiver with the predefined identification where the position and/or location of the high-frequency transceiver with the predefined identification defines the reference system of the virtual representation.

The data processing device, based on the information received from the second antenna signal processing device about the position and/or location of the high-frequency transceiver, outputs the virtual representation of the object at least correctly regarding position and/or location relative to the second receiving antenna and/or a predefined reference point, and/or information by means of which the absolute position and/or location of the object relative to the second receiving antenna and/or a predefined reference point is determinable and/or transformation information representing the deviation of an actual position and/or location of the object from its target position and/or location.

With a system according to a second aspect in communication with a disclosed system according to a first aspect, unique determination of the position and/or location of the object in both absolute and relative terms can hereafter in turn be effected solely due to the measurement of the position and/or location of the high-frequency transceiver, when having knowledge of the information stored in the memory device by means of the system according to the first aspect of the invention. Determination of the position and/or location of the object is here effected at only low costs, quickly, with almost any accuracy and in a very reliable manner.

It can be of importance that an object, once measured by means of a disclosed system according to the first aspect, the high-frequency transceiver of which can be located at any position on or in the object, can always be used correctly regarding position and/or location for a variety of processes and/or procedures that depend on the position and/or location of the object, for the mere fact that the data processing device outputs information to the process or procedure control allowing the process or procedure controls, respectively, to determine the position and/or location of the object in absolute or relative terms.

The information stored in the memory device regarding the virtual representation of the object and the position and/or location of the high-frequency transceiver and the respective reference system definition can thereby be exchanged quickly and easily among different data processing devices, and thus also the information about the actual location of the specific high-frequency transceiver of the object uniquely identifiable due to its identification, and thereby also that of the reference system of the object.

Correct application of the high-frequency transceiver regarding position and/or location on or in an object is an elaborate process, the accuracy of which can significantly influence success or reliability of the subsequent processing and/or procedural steps. A special feature of disclosed embodiments is now that application of the high-frequency transceiver (s) on or in the object can be performed in a chaotic manner, i.e. its position and/or location relative to the object can be chosen at random. For example, in a molding process, such as in plastic molding, high-frequency transceivers can already be provided in the raw material and/or in the mold which are then during the molding process arranged at random on and/or in the object.

After completion, the position and/or location of the high-frequency transceiver (s) is (are) then measured, such as while the object is still located in the mold and thereupon the reference system of the virtual representation of the object within the memory device is defined according to the first aspect of the invention. If this is still done in the mold, there may only be the need to determine the position of the high-frequency transceiver relative to the receiving antenna, since it has a predefined position and/or location relative to the mold.

Alternatively or additionally, there is the possibility of measuring the position and/or location of the high-frequency transceiver (s) relative to at least one predefined reference point where the reference point can be predetermined or in a fixed relation regarding the position and/or location to the position and/or location of the object. Thereby, there is also the possibility of defining the reference system of the virtual representation of the object according to the first aspect of the invention.

Definition of the reference system of the virtual representation thus performed can subsequently be drawn on by the second aspect of the invention for outputting data and/or information from the data processing means to determine the exact position and/or location of the object in a plurality of subsequent processing and/or procedural steps in an absolute and/or relative manner, respectively by means of a system according to the second aspect of the invention.

Thereby the known problems of prior art regarding the need for accurate positioning and/or repositioning of the objects are overcome, for example, when picked-up by a robot, since the respective processing and/or handling machines due to the knowledge of the exact position and/or location of the object can take into account deviations from a target position.

For this, in one embodiment of the second disclosed aspect, the data processing device is connected to at least one control device and/or a test facility of at least one processing and/or handling machine receiving the date or information output from the data processing device, and where the data or information received from the data processing device influences the control or test program of the control device or test facility such that the control or test program is adapted to the actual position and/or location of the object. This can, for example, be effected by the application of appropriate transformations of the control signals of a control program, so that, for example, a predetermined trajectory is adapted by the transformation relative to the actual position and/or location of the object and/or control commands for movement between a target and an actual position of the object are output to the control device.

Though only a few examples of adaptation of control or test programs for control devices or test facilities to the actual position and/or location, as can be determined using a system according to the second aspect of the invention, were presently given, the person skilled in the art is aware that the data or information output by the data processing device may be used in a variety of ways for adapting control or test programs for such devices in a variety of processing and/or procedural steps to the specific situation encountered due to the measurement by means of a system according to the second aspect of the invention.

In one embodiment, the data processing device performs a test whether there is a deviation of the actual position and/or location of the object from its target position and/or location and returns a result value signaling "deviation" or "no deviation".

In an embodiment of the invention, the data processing device is at least indirectly connected to a display device, where the virtual representation of the object output by the data processing device can be in a correct manner in terms of the position and/or the location and/or a virtual representation of the object in a target position and/or location and/or the result value are graphically and/or visually output by the display device. This allows easy control of the position and/or location of an object by operating personnel of production machines equipped with the device according to the invention and possibly even manual intervention in the event that a "deviation" from the target position of the object is detected.

The result value can be for the purpose of simple visual detection at least partially output in the form of a color-coded visual output, such as, for example, a green field or a green dot, respectively, or a red field or a red dot, respectively, by issuing text result messages, such as "OK" or "FAIL" and/or as voice output. In a further embodiment of the invention, actuation or non-actuation of a positioning element and/or a release or blocking of at least one shift interlock, which can be of at least one software interlock can alternatively or additionally occur, if the data processing device as the result value outputs a signal representing "no deviation "or" deviation", respectively.

It can in this manner can be ensured, for example, that only incorrect positioning of the object which is correctable by the system according to the invention result in further handling of the object, whereas in the event of considerable deviations of the actual position and/or location from the target position and/or location that can no longer be corrected by adjustments to the control and/or test programs, further processing is either modified, stopped, interrupted, shut down, signals are output, markings are applied and/or the like.

In an embodiment of the invention the predefined reference point is defined by at least one second stationary and/or locationally fixed high-frequency transceiver, the high frequency signals of which are received by the first and/or second receiving antenna, by means of which the position and/or location of the high-frequency transceiver is determined relative to the respective at least one first and/or second receiving antenna and/or relative to the object. Although the predefined reference points may be defined by high-frequency transceivers, there is the possibility of performing the determination within the meaning of invention, for example, relative to an essentially stationary and/or locationally fixed work form, such as an injection molding tool, a mold, and/or the like, generally as long as the object is arranged in these forms, or relative to a fir bore, measuring pins, and/or the like relative to which the position of the high-frequency transceiver(s) is (are) determined.

In an embodiment of the invention, the receiving antenna is composed of a matrix of several interacting receiving antennas, where the interaction is controlled by a third antenna signal processing device and/or the first and/or second antenna signal processing device. Such an interaction of several receiving antennas in the form of a matrix warrants for improved directional characteristics of the receiving antenna as well as improved geometric resolution and in particular secure detection of all high-frequency transceivers disposed in the region of the antenna matrix, even if their transmission signals are dampened by strongly dampening elements, such as metal objects.

With such a matrix-like arrangement of receiving antennas, it is moreover also particularly advantageous, that a transmission signal from a high-frequency transceiver recorded by multiple receiving antennas involves multiple measurement of the position and/or location of the object from various directions by the data processing device, by means of which deviations between the positions and/or locations the positions determined by the individual transmission/receiving systems can be detected and corrected if necessary.

In an embodiment of the invention, the data processing device comprises a plurality of interacting data processing devices, where data communication between the plurality of data processing devices can be effected by means of optical, radio or wired data connections. In this, in particular interaction of a stationary data processing device with a mobile data processing device can be advantageous, especially when in the framework of the data processing, large volumes of data are to be processed or to be stored. The mobile data processing device could in this case at least partially be a kind of an input-output unit for the stationary data processing device.

In an embodiment of the invention, the memory device is in a conventional manner connected to the data processing device, where data communication between the data processing device and the memory device can be performed by means of optical, radio and/or wired data connections. Alternatively or additionally thereto, in one embodiment of the invention, the memory device is connected to the high-frequency transceiver, and in particular disposed therein. The measured values or information stored in the memory device of the high-frequency transceiver can then as a data record be integrated into the high-frequency signals transmitted by the high-frequency transceiver and evaluated by the first and/or second antenna signal processing device and transmitted to the data processing device.

This leads to a particularly advantageous embodiment of the invention because the information on the position and/or storage of the high-frequency transceiver necessary for handling the object is then stored on or in the object, and thus also its reference system definition within the transceiver itself, and can be read out and processed by the receiving system according to the invention according to the second aspect of the invention. The information relating to the respective object is in this case therefore inseparably connected to the same, but is with regard to its content flexibly and in particular only after recording and processing by a system according to the first aspect of the invention uniquely and permanently associated with the object. This leads to considerable flexibility of manufacturing and production processes, as no data exchange needs to take place between different data processing devices, although this is nevertheless possible, but the object can be handled flexibly merely on the basis of the data and information stored in the memory device of the high-frequency transceiver.

The at least one first and/or second transmitting antenna is the first or second receiving antenna, respectively. Although this may seem generally advantageous, it is also possibly of advantage to have a separation of the transmitting and receiving system in terms of location. For example, energetic aspects could be in favor of designing the transmitting system as being independent of the receiving antenna.

In one embodiment of the invention, the first and/or second receiving antenna and/or the first and/or second transmitting antenna are set up such that they can receive and transmit, respectively, on a plurality of frequency bands and in particular the first and/or second receiving antenna, the first and/or second transmitting antenna and/or the first, second and/or third antenna signal processing device are set up such that transmission and reception of high-frequency signals is possible at least substantially simultaneous or variable in the frequency domain over a plurality of frequency bands.

It is possible by means of such a configuration to improve the determination of the position and/or location of at least one high-frequency transceiver possibly in a multi-stage process, until the desired accuracy of the specific position and/or location has been reached. For this, for example, determination of the position and/or location of the high-frequency transceiver occurs at a low transmission and/or reception frequency, i.e. a longer wavelength, and thereafter, for improving the measurement, at least one determination of the position and/or location of the same high-frequency transceiver at a higher transmission and/or reception frequency, i.e. a shorter wavelength.

The transmission and/or reception frequency is here to be understood as being both the transmitting frequency of the transmitting antenna as well as that of the high-frequency transceiver, where the reception frequency likewise can be both the reception frequency of the receiving antenna, as well as that of the high-frequency transceiver.

Another possibility is provided by the continuous change of the transmission and/or reception frequency during the measurement, so that by means of the resulting (and measurable) phases and amplitudes in the region of at least one receiving antenna which is highly distance- and angle-dependent, very exact determination of the position and/or location of at least one high-frequency transceiver is possible. For example, already a so-called sweep of the transmission signal of the high-frequency transceiver or transceivers across a relatively small frequency range would during the measurement be able to lead to a very precise determination of the position and/or location of the high-frequency transceiver.

The transmission and/or reception devices are in the system according to the invention may be designed such that a not necessarily simultaneous transmission and/or reception of frequencies in the high kHz-range is enabled, and optionally also in the low, middle and/or high MHz-range, and can further be in the low, middle and/or high GHz-range, and beyond that also up into the THz-range, up to wavelengths in the far infrared. Such frequency ranges can be generated and emitted or received, respectively, in different ways which are known in the art.

However, that in cases of using multiple transmission and/or reception devices, i.e. combinations of transmitting and/or receiving antennas with their respectively associated antenna drivers and antenna signal processing devices, they can be designed for respectively different transmission and/or reception frequency ranges, so that, for example, a transmitting antenna, (together with associated components and receiving devices) supplying a larger area, is operated in the MHz-range, whereas an antenna matrix (together with associated components and receiving devices), simultaneously supplying only a relatively small partial area of this region, is operated in GHz-range. Due to the different frequency ranges with which the respective transmission and/or reception devices are operated and the various influences of objects, interference components, etc. associated therewith are detected. Such an embodiment also enables to check the positions and/or locations of a high-frequency transceiver detected by different transmission and/or reception devices or systems, respectively, in terms of whether they match. This presents not only the possibility of redundant determination of the position and/or location but also enables as needed validation of measurements of different systems and thus a plausibility check which is of advantage, in particular for applications with high demands on accuracy.

Frequency mixing is merely mentioned as an illustration by way of example as a possibility for producing transmission and/or reception frequencies—also dynamically changing across certain frequency ranges. It is essential that the accuracy of the position and/or location determination increases already with the use of higher transmission and/or reception frequencies solely due to the shorter wavelength and both with the higher measurement accuracy associated therewith as well as the possibility of using more compact antennas, for which reason sometimes depending on the required accuracy of the position and/or location determination—the use of very high frequencies can be of advantage.

In one embodiment of the second aspect of the invention, the virtual representation comprises information on the required accuracy of the position and/or location match of the high-frequency transceiver, where in particular respective information on the required accuracy of the position and/or location match between the target and actual position and/or location of a high-frequency transceiver in combination with the target position and/or location of the high-frequency transceiver with the respectively predetermined identification is can be provided within the virtual representation. Alternatively, the information regarding the required accuracy of the position and/or locational match between the target and the actual position and/or location of a high-frequency transceiver can also be stored independently of the virtual representation, where by means of the respective, unique identifications of the high-frequency transceivers, a unique allocation of the "matching accuracy" of the position and/or location match to the respective transceivers of the virtual representation can be created.

Thereby, the system according to the invention also offers a possibility of allowing larger deviations between the target and the actual position and/or location for certain objects that are identifiable via the identification of the high-frequency transceiver disposed thereon or therein. This can be performed to the level of individual objects.

In one embodiment of the invention, the data processing device is at least indirectly connected to at least one external imaging recording device, where the imaging recording device can comprise a video camera, an infrared camera, an X-ray camera or an echograph, and in one embodiment a high resolution video camera.

In one embodiment of the invention, the image recording device is used to record images during the measurement of an object or high-frequency transceiver disposed thereon or therein use of the system, for example, for guiding and/or control purposes. It is also provided that images recorded by the imaging recording device can be displayed on the display device of the data processing device.

At least one image can be recorded by the external imaging recording device is stored in the memory device together or in association with the virtual representation of the object, where the image prior to its storing can optionally be subjected to image processing, in particular contrast enhancement, segmentation, edge detection, subtraction or the like, thereby possibly enhancing contours of the recording situation given during measurement of the object or the high-frequency transceivers arranged thereon or therein thereby achieving improved visual perception when displayed.

The image captured by the image recording and/or the stored image is can be displayed by means of the display together with the data and information output by the data processing device. This can be done, for example, by a display in the manner of a so-called "augmented reality" in which a video image captured live by the image recording device is displayed with graphic elements that specify a target and/or an actual position and/or location of the high-frequency transceiver.

In an embodiment of the invention, the high-frequency transceiver is equipped with means for detecting physical and/or chemical variables, which are selected from a group comprising thermal sensors, pressure sensors, humidity sensors, chemical sensors, in particular for the detection of specific chemical substances, radiation sensors, in particular for the detection of visible light, ultraviolet, X-rays and the like, sensors for measuring time and the like, as well as storage media, storing measurement values detected continuously or at discrete times by the means for detecting physical and/or chemical variables. The measured values or information stored in the memory device can then be used as a data record integrated into the high-frequency signals transmitted by the high-frequency transceiver and evaluated by the first and/or second antenna signal processing device and transmitted to the data processing device.

By means of information recorded by these means for detecting physical and/or chemical variables and stored in the storage means, in addition to the position and/or location information as well as the identification of a high-frequency transceiver, the system according to the invention can thereby obtain information which is mainly of historical nature or also represent specific information on conditions, and information about the influences of the environment, which the high frequency transceiver has been or is exposed to at the time of measurement. Merely by way of example, scenarios are mentioned in which the sensors of the high-frequency transceiver have over a period of e.g. 2 hours measured and stored the ambient temperature. This can for example be used in the case of arrangement of the sensors on fabric mats which are used in the production of carbon fiber materials for the purpose of obtaining specific information on the temperatures prevailing during baking and in particular on the time-temperature profile. Such information is sometimes of considerable importance for quality control. In a similar manner, the age of an object can also be recorded, in that the period recorded by a sensor for measuring the time since activation of the sensor, which may occur during measurement of the high-frequency transceiver by means of a system according to the first aspect of the invention.

In a system embodiment of the invention, RFID-markers are used as high-frequency transceivers, these markers generally being able to receive and transmit in a plurality of frequency bands and programming of the markers additionally being possible. In particular, so-called passive RFID-markers are generally used, i.e. those which do not have their own power supply in the form of a long-life battery or the like. Such RFID-markers are generally supplied with energy by the electromagnetic field of the transmission device for activating them and thereafter if necessary for receiving commands, which then lead to the transmission of a reply sequence by the RFID-marker. The reply sequence can contain information stored by the marker, such as the identification and other information previously stored during programming.

FIG. 1 schematically shows an injection molding tool of an injection molding machine comprising an ejector member 2 and a nozzle member 1 in an open state, directly prior to ejecting object 10 accommodated therein and produced by injection into the mould cavity. Other components of the injection molding machine are not shown for reasons of clarity, but are known to the person skilled in the art of injection molding technology.

As is also evident from FIG. 1, a high-frequency transceiver 20 is arranged on the object 10. In this representation, the high-frequency transceiver 20 is arranged in the region of the surface of the object 10, which, however, is only one of a plurality of possible arrangements for the high-frequency transceiver 20. The arrangement of the high-frequency transceiver 20 can be arbitrary and does not need to be at a predefined location. Instead, disclosed embodiments precisely provides the means to be able to work in a manner equally accurate and reliable with objects for which the arrangement of high-frequency transceivers is arbitrary.

It is for example conceivable, that the raw material used of the injection molding process, i.e. the plastic pellets, have high-frequency transceivers mixed in them, which can be designed such that they are able to withstand the mechanical and thermal stresses occurring during the injection molding process, which then during injection into the mold cavity are distributed at random within the object 10. Such random distribution of the high-frequency transceivers, when using disclosed systems according to the first and second aspects, then allows for reliably processing and using the object in further manufacturing processes regardless of the object's position and/or location.

Alternatively to sprinkling-in high frequency transceivers into the raw material, simple insertion of the transceiver or transceivers into the mold cavity of the injection mold tool can also be performed, where it is irrelevant, at which point within the cavity the transceiver or transceivers are arranged and ultimately located within the object. It is by means of the first disclosed aspect of the invention in each of the aforementioned cases ensured, that the reference system of each individual object is uniquely defined and a virtual representation of the object can therefore be drawn on at least partially to be able to reliably detect the exact position and/or location of the object in further processing steps and thereby provide error-free further processing or use, respectively.

Like in the situation illustrated in FIG. 1, when the mold is open, immediately prior to ejection of the object 10 from the mold cavity, the position and/or location of the high-frequency transceiver 20 is determined by the first receiving antenna 51 and the associated first antenna signal processing device 52. Since the object 10 at this time is still in the mold and therefore in a spatial position or location defined relative to the receiving antenna 51, unique definition of the reference system of the object relative to the measured high-frequency transceiver 20 can occur and also be stored in the memory device 53 due to the position and/or location of the high-frequency transceiver 20, which is detected by means of the receiving antenna 51 and the first antenna signal processing device 52 and is then stored in the memory device together with the virtual representation of the object 10. As a result—when having knowledge of the information stored in the memory device 53—the position and/or location of the object 10 can always be determined with certainty solely by means of determining the position and/or location of the high-frequency transceiver 20.

In cases in which, when measuring the position and/or location of the high-frequency transceiver 20, the position and/or location of the object 10 cannot be in a spatial position and location defined relative to the receiving antenna 51, determination of the position and/or location of the high-frequency transceiver 20 can also be performed relative to a predefined reference point 21, where the reference point 21 can be defined by a further high-frequency transceiver, the position and/or location of which when measuring is likewise determined by the receiving antenna 51 and the first antenna signal processing device 52. In this embodiment, the predefined reference point 21 also has a defined spatial position and location relative to the high frequency transceiver. Like this as well, unique definition of the reference system of the object 10 can occur relative to the measured high-frequency transceiver 20 and stored in the memory device 53, so that thereafter—with knowledge of the information stored in the memory device 53—the position and/or location of the object 10 is always reliably determined solely by determining the position and/or location of the high-frequency transceiver 20.

In an embodiment differing from FIG. 1, the memory device 53 is connected to the high-frequency transceiver 20 and can be disposed within the high-frequency transceiver 20. After detecting the position and/or location of the high-frequency transceiver 20 by means of the receiving antenna 51 and the first antenna signal processing device 52, the determined position and/or location information and the information determined therefrom by the data processing means 54 regarding the reference system definition and possibly also the virtual representation can therefore be transmitted by a radio-frequency transmission by means of the transmitting antenna 51 to the memory device 53 being connected to the high-frequency transceiver 20 and stored therein.

However, there are in any case unique relationships between the information and data stored in the memory device 53 and the high-frequency transceivers, either due to storage in a memory device associated with the high-frequency transceivers itself and/or the identification of the high-frequency transceiver, which uniquely associates the information and data stored in a memory device connected to said data processing device, in particular the virtual representation, the position and/or location of the high frequency transceiver and/or the reference system definition of the object with the respectively related high-frequency transceiver (and thereby the object).

Figure 2:
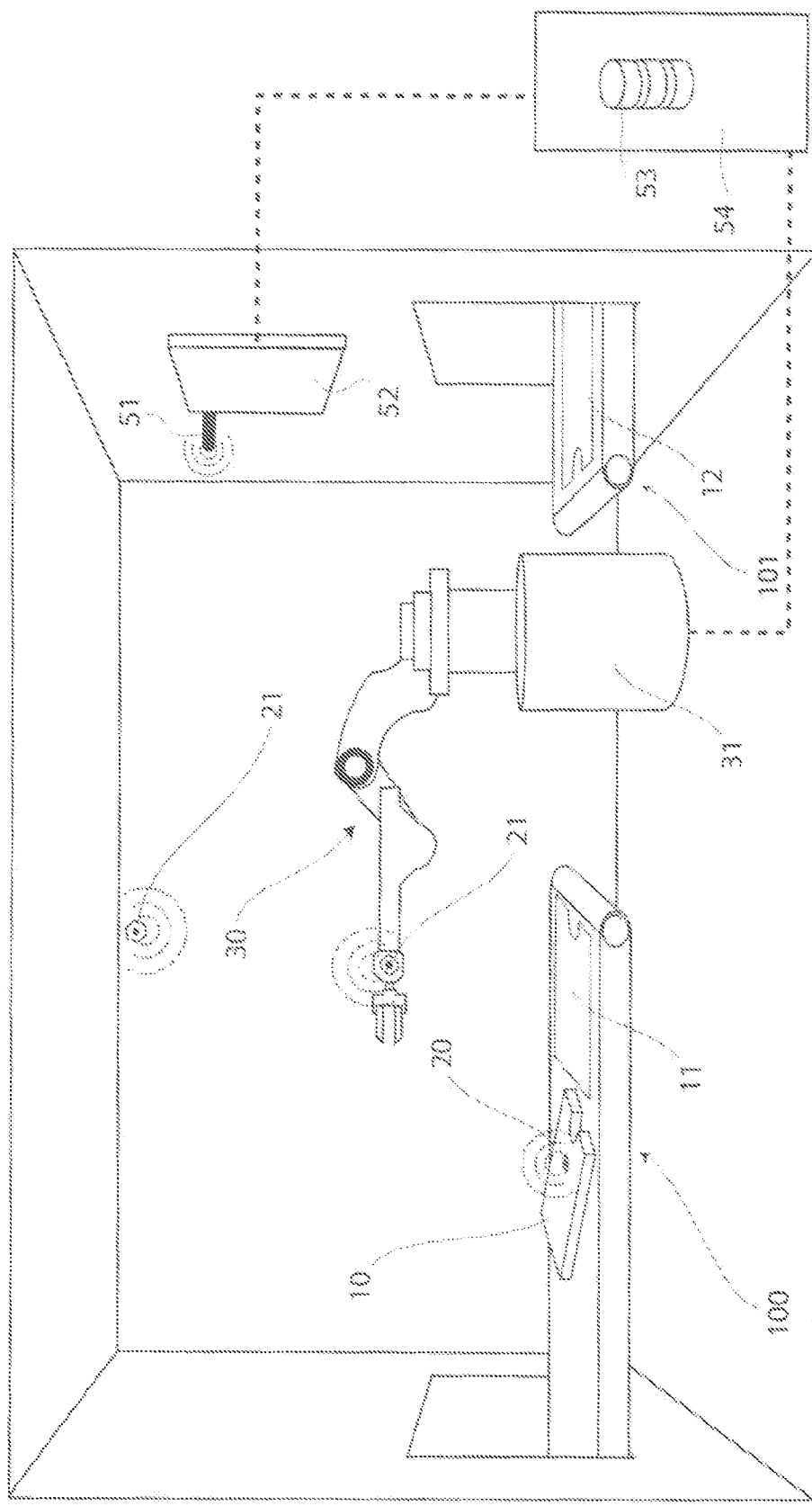
FIG. 2 shows a schematic representation of a situation of application of an embodiment of the second disclosed aspect.

FIG. 2 by way of example shows a situation of application of an embodiment according to the second disclosed aspect. Processing of an object 10 by a robot 30 is here shown in a simplified manner, where the object 10 is on the feeding side 100 of the processing step provided with a high-frequency transceiver 20. As can be gathered from FIG. 2, the position and location of the object 10 on the conveyor belt on the feeding side 100, however, differs from its target position 11. In a conventional arrangement, this could lead to disturbances in processing the object 10 by means of the robot 30, since the control program of the robot is configured such as to assume correct positioning and placement of the object 10. The robot 30 can then not grip the object 10 without any further measures, for example, those disclosed herein.

As shown in FIG. 2, the control device 31 of the robot 30 is connected to the data processing device 54 and can obtain data and information from it. By means of its control program, the control device 31 of the robot 30 serves to control the motion of the robot components such that the robot 30 can run the predetermined trajectories and perform defined actions such as gripping and releasing objects. In the application situation illustrated, the robot 30 grips the object 10 on the feeding side 100 and places it in the position 12 designated for this in the reverse orientation on the discharge side 101 of the conveyor. Of course, this for the purpose of simplified description represents only a single example form of robot processing, and it is clear to the person skilled in the art that any form of processing or handling the object 10 by one or more robots or other devices with the aid of the invention can possibly be simplified.

The receiving antenna 51 in combination with the second antenna signal processing device 52 captures the position and/or location as well as the identification of the high-frequency transceiver 20, which is disposed on the object 10, as well as, possibly in addition to this, the positions and/or locations of the high-frequency transceivers 21, which may be arranged, for example, both fixed in space and/or on the arm of the robot 30. Alone from the position and/or location of the high-frequency transceiver 20 thus detected, given a spatially fixed relationship between the receiving antenna 51, and knowledge of both the target position and location 11 of the object 10 and the information and data stored in the memory device 53, in particular the virtual representation, the high-frequency transceiver and the reference system can have the position and location of the object 10 be uniquely determined on the feeding side 100.

Furthermore, the absolute position and/or location of the object 10 relative to the high-frequency transceiver serving as the predetermined reference point 21 disposed in space in a stationary manner can be determined and/or the relative position and/or location of the object 10 relative to the high frequency transceiver disposed on the arm of the robot. From the information thus obtained, the system according to the invention can by means of the information stored in the storage device 53 also in different ways determine the exact position and/or location of the object 10 solely on the basis of the high-frequency transceiver 20 arranged thereon or therein in a manner absolute in space and/or relative to the robot arm. The data processing device 54 can as a consequence pass the relevant data and information to the control device 31 of the robot 30, which can subsequently adapt its control program, so that the position and/or location deviating from the target position and location 11 of the object 10 can be taken into account and the robot 30 receives correspondingly changed control commands that cause him to correctly and accurately grip the object 10 thus located and be able to continue working.

FIG. 3 shows another embodiment of the invention corresponding to a situation of application of FIG. 2. To the extent that FIG. 3 provides no further information to the elements shown there, reference is made to the description of FIG. 2.

Instead of disposing the receiving antenna 51 in space as in FIG. 2, the receiving antenna 51 is here provided to attach it to the arm of the robot 30 itself. The second antenna signal processing device 52 can here likewise be either mounted on or in the robot, or be integrated with the data processing device 54. It is also possible, although shown otherwise in FIG. 3 to arrange the data processing device 54 with all its components within the control 31 of the robot 30. This represents a somewhat simplified variant of the embodiment according to FIG. 2, since here the system according to the invention with the receiving antenna 51 mounted to the robot 30 can determine the position and/or location of the high-frequency transceiver 20 immediately relative to the receiving antenna 51 and as a consequence thereof, the control program of the control device 31 for controlling the motion of the robot can in turn be adapted. In this case, no previous knowledge of a target position of the object 10 is required for the correct control of the robot 30, but the system allows for continuous adaptation to the conditions of the individual situation.

If verification of the relative position and/or location thus determined or the determination of an absolute position and/or location of the object in space is for example additionally required, this can be achieved by detecting the position and location of the high-frequency transceiver serving as the predetermine reference point 21 fixed in space in a stationary manner, which in turn serves as a reference point for determining the position and/or location of the high-frequency transceiver.

FIG. 4 shows an embodiment according to FIG. 3 essentially corresponding to the embodiment of the second disclosed aspect, but in a situation of application differing therefrom. To the extent that FIG. 4 provides no further information to the elements shown there, we shall make reference to the description of FIGS. 3 and 2.

In the situation of application shown in FIG. 4, the object 10 is gripped by the robot 30 in the manner described above and joined with the object 15 which is here by way of example placed on the discharging side 101. As can be seen from FIG. 4, the object 15 is on the discharging side 101 likewise not provided in its target position and location 13, so that without further measures according to disclosed embodiments, no correct joining of the two objects 10 and 15 can be achieved.

Like the relative position and/or location of the object 10 can be determined relative to the arm of the robot 30 or the absolute position and/or location of the object 10 relative to the high-frequency transceiver serving as the predetermine reference point 21 disposed in space in a stationary manner, this is in a corresponding manner possible with the system according to the invention according to the second aspect for the high-frequency transceiver 23, which is disposed on or in the second object 15. In the same manner, by means of the system shown here, the position and/or location of the high-frequency transceiver of the first object 10 and thereby also of the first object itself can be related to the position and/or location of the high-frequency transceiver of the second object 15 (and thereby also of the second object itself), in that one of the two high-frequency transceivers 20, 23 is determined as being a predefined reference point for the specific situation of application, and related thereto, the position and/or location of the respective other high-frequency transceiver 23, 20 is determined.

By means of this embodiment of the invention, data and information can be transmitted by the data processing device 54 to the control device 31 of the robot 30, on the basis of which the control program of the control device 31 can then adapt the specific positions and/or locations of the objects 10, 15, and thus change the motion guidance of the robot 30. Even when the objects 10, 15 are not properly placed, it can in this manner be ensured that they are joined accurately in the same conditions given, in that the relative positions and/or locations of the objects 10, 15 are properly matched to each other, which were determined on the basis of the positions and/or locations of the high-frequency transceiver serving as the predetermine reference point 21, and high-frequency transceiver 23, the virtual representations and the reference systems thereby defined.

In another situation of application of the invention not described in any detail by any figure, the high-frequency transceiver and a plurality of high-frequency transceivers are arranged to so-called prepregs (woven mats) for manufacturing glass or carbon fiber components, where a system according to the first aspect of the invention determines the reference system of the prepreg in such a way—and the corresponding information is stored—that the weaving direction for the fabric is obtained therefrom. After processing the prepreg to form a component assembly, the position and/or location of the high-frequency transceiver can be determined by a system according to the second aspect of the invention, and based thereupon the arrangement of the prepreg in particular relative to its weaving direction in the component assembly can be determined. When a component assembly is composed of several layers of prepregs, the relationship in the different weaving directions of the various layers can thus be determined and it can be verified whether the component assembly complies with certain prescribed quality requirements. Similarly, there is the possibility of further processing steps to match the component assembly to the weaving direction(s) of the processed prepregs thus determined.

Disclosed systems can be used in a variety of applications, especially in such applications in which the exact position and/or location of an object or person (or parts thereof) is required or must be verified. In particular, a system according to the present invention is used in controlling the positioning and/or storage of at least one object, or part of a human, where there is an adaptation of an application situation of the specifically defined position and/or location of the object or the part of the human. This is of great importance for example in the field of robotics, where the position and/or location of an object must in principle always be the same—for example, when the robot grips an object—so that neither the robot nor the object or human suffer any damage.

Disclosed embodiments now permits avoiding this requirement, but moreover to individually adapt robot control to the specific position of the object. This achieves considerable simplification of the operating requirements. Another field of application is the detection of a plurality of high-frequency transceivers or objects, respectively, relative to each other, for example during robotic assembly of individual parts.

Disclosed embodiments, however, can also be used in quality control, for example, for checking carbon fiber products. In this, the location of the fiber mats, provided with high-frequency transceivers, whose direction of weaving is determined in a unique manner by the position and location of the transceiver (the reference system of the fiber mat is therefore defined in the direction of weaving by the high-frequency transceiver), can in the end product be uniquely detected—this also applies to layers in the interior—thereby ensuring for a variety of carbon fiber elements the necessary adherence to the fiber orientation in the weaving direction in the various layers of the element.

It is clear that the fields of applications of the present invention are predominantly in the field of controlling and monitoring production processes. Therefore, individual cases of such application examples are explained in detail in the following description. Restrictions of the very general teaching of the present invention, which has been presented above and which additionally result herefrom for the person skilled in the art, however, are expressly not intended by these descriptions of individual embodiments. Moreover, there are a large number of other applications of the present invention and its embodiments.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The invention claimed is:

1. A system for determining at least one of position and location of at least one transceiver (20) relative to an object (10) comprising:

at least one receiving antenna (51) set up such that signals transmitted by said transceiver (20) are received by said receiving antenna, said transceiver (20) being fixedly arranged in a stationary and location-fixed manner on or in said object (10);

at least one transmitting antenna set up for transmitting signals of at least one frequency band provided for being received by said transceiver (20) and thereby in turn causing the transmission of signals by said transceiver (20);

at least one antenna signal processing device (52) connected to said receiving antenna (51) set up to evaluate said signals received from said receiving antenna to therefrom determine at least one of a spatial position and location as well as an identification of said transceiver (20) relative to at least one of said object (10) and at least one predefined reference point; and at least one data processing device (54) being at least indirectly connected to said first antenna signal processing device (52) and receiving information therefrom about at least one of said position, location, and identification of said transceiver (20);

wherein:

in a memory device (53) connected to said data processing device (54) a data structure is provided comprising at least a partial virtual representation of said object (10); and wherein said information regarding at least one of said position and location of said transceiver (20) as well as its identification being stored together or combined with said partial virtual representation of said object (10) in said memory device (53) and there is a definition of a reference system of said partial virtual representation relative to at least one of said position and location of said transceiver (20).

2. The system according to claim 1, wherein said at least one predefined reference point is defined by at least one of at least one second stationary and locationally fixed transceiver (21) signals of which are received by said receiving antenna (51), wherein at least one of said position and or location of said transceiver (20) is determined relative to at least one of said respective receiving antenna (51) and said object (10).

3. The system according to claim 1, wherein said receiving antenna (51) is composed of a matrix of a plurality of interacting receiving antennas, where an interaction of said interacting receiving antennas is controlled by at least one of another antenna signal processing device and said antenna signal processing device (52).

4. The system according to claim 1, wherein said data processing device (54) comprises a plurality of interacting data processing devices, where data communication between said plurality of data processing devices is effected by optical, radio or wired data connections.

5. The system according to claim 1, wherein said memory device (53) is connected to at least one of said data processing device (54) and said transceiver (20), and data communication between said data processing devices (54) and said memory device (53) is effected by optical, radio or wired data connections.

6. The system according to claim 1, wherein said transmitting antenna is said receiving antenna (51).

7. The system according to claim 1, wherein said data processing device (54) is at least indirectly connected to at least one external imaging recording device, where said imaging recording device comprises a video camera, an infrared camera, an X-ray camera or an echo-graph.

8. The system according to claim 7, wherein at least one image recorded by said external imaging recording device is stored in said memory device (53) together or in association with said partial virtual representation of said object (10), where said image, prior to its storing, is subjected to image processing including contrast enhancement, segmentation, edge detection, or subtraction.

9. The system according to claim 1, wherein said transceiver (20) is equipped with means for detecting at least one of physical and chemical variables, which are selected from a group consisting of thermal sensors, pressure sensors, humidity sensors, chemical sensors, radiation sensors, and storage means which store measurement values detected continuously or at discrete times by said means for detecting at least one of said physical and said chemical variables.

10. The system according to claim 9, wherein said measured values or information stored in at least one of said memory means and memory device (53) are then as a data record integrated into said signals transmitted by said transceiver (20) and evaluated by said antenna signal processing device (52) and transmitted to said data processing device (54).

11. The system according to claim 1, wherein said transceiver (20) is an RFID-device (Radio Frequency Identification device).

12. A system for determining and controlling at least one of position and location of at least one object (10) comprising:
at least one receiving antenna (51) set up such that signals transmitted by a transceiver (20) are received by means of said receiving antenna, said transceiver (20) being fixedly arranged in a stationary and location-fixed manner on or in said object (10) for at least one of determining and controlling at least one of said position and location;
at least one transmitting antenna set up for transmitting signals of at least one frequency band provided for being received by said transceiver (20) and thereby in turn causing the transmission of signals by said transceiver (20);
at least one antenna signal processing device (52) connected to said receiving antenna (51) set up to evaluate signals received from said receiving antenna to therefrom determine at least one of a spatial position and location as well as an identification of said respective transmitting transceiver (20) relative to at least one of said receiving antenna (51) and at least one predefined reference point; and
at least one data processing device (54) at least indirectly connected to said antenna signal processing device (52) and receiving information therefrom about at least one of said position, location, and identification of said transceiver (20);
wherein
in a memory device (53) connected to said data processing device (54) a data structure is provided at least comprising a partial virtual representation of said object (10) and information regarding at least one of said position and location of said transceiver (20) with said predefined identification, where at least one of said position and location of said transceiver (20) with said predefined identification defines a reference system of said partial virtual representation; and wherein said data processing device (54) based on the information received from said antenna signal processing device (52) about at least one of said position and location of said transceiver (20), outputs said partial virtual representation of said object (10) at least one of a target position and location relative to at least one of said receiving antenna (51), and said predefined reference point, and information by means of which at least one of an absolute position and location of said object (10) relative to at least one of said receiving antenna (51) and said predefined reference point is determinable, and transformation information representing a deviation of at least one of an actual position and location of said object from at least one of its target position and location.

13. The system according to claim 12, wherein said data processing device (54) is connected to at least one of at least one control device (31) and a test facility receiving the data or information output from said data processing device (54) and where said data or information received from said data processing device (54) influences said control or test program of said control device (31) or said test facility such that said control or test program is adapted to at least one of said actual position and location of said object (10).

14. The system according to claim 12, wherein said data processing device (54) performs a test whether there is a deviation of at least one of said actual position and location of said object (10) from at least one of said target position and location and returns a result value signaling "deviation" or "no deviation".

15. The system according to claim 14, wherein said data processing device (54) is connected to a display device, where said partial virtual representation of said object (10) output by at least one of said data processing device (54) and said virtual representation of said object (10) in at least one of said target position, location, and said result value is visually and graphically output by said display device.

16. The system according to claim 14, wherein said result value is at least partially output in a form of at least one of a color-coded visual output by issuing text result messages, and by voice output, by a positioning element, and by releasing or blocking at least one interlock when said data processing device (54) as said result value outputs a signal representing "no deviation" or "deviation", respectively.

17. The system according to claim 12, wherein said at least one predefined reference point is defined by at least one of a second stationary and locationally fixed transceiver (21) signals of which are received by said receiving antenna (51), wherein at least one of said position and location of said transceiver (20) is determined relative to at least one of said receiving antenna (51) and relative to said object (10).

18. The system according to claim 12, wherein said receiving antenna (51) is composed of a matrix of several interacting receiving antennas, where an interaction of said several interacting receiving antennas is controlled by at least one of another antenna signal processing device and said antenna signal processing device (52).

19. The system according to claim 12, wherein said data processing device (54) comprises a plurality of interacting data processing devices, where data communication between said plurality of data processing devices is effected by optical, radio or wired data connections.

20. The system according to claim 12, wherein said memory device (53) is connected to at least one of said data processing device (54) and said transceiver (20), and data communication between said data processing devices (54) and said memory device (53) is effected by optical, radio or wired data connections.

21. The system according to claim 12, wherein said transmitting antenna is said receiving antenna (51).

22. The system according to claim 12, wherein said data processing device (54) is at least indirectly connected to at least one external imaging recording device, where said imaging recording device comprises a video camera, an infrared camera, an X-ray camera or an echo-graph.

23. The system according to claim 22, wherein at least one image recorded by said external imaging recording device is stored in said memory device (53) together or in association with said partial virtual representation of said object (10), where said image, prior to its storing, is subjected to image processing including contrast enhancement, segmentation, edge detection, or subtraction.

24. The system according to claim 12, wherein said transceiver (20) is equipped with means for detecting at least one of physical and chemical variables selected from a group consisting of thermal sensors, pressure sensors, humidity sensors, chemical sensors, radiation sensors, sensors for measuring time, and storage means which store measurement values detected continuously or at discrete times by said means for detecting at least one of physical and chemical variables.

25. The system according to claim 24, wherein said measured values or information stored in at least one of said memory means and memory device (53) are then as a data record integrated into said signals transmitted by said transceiver (20) and evaluated by said antenna signal processing device (52) and transmitted to said data processing device (54).

26. The system according to claim 12, wherein said transceiver (20) is an RFID-device (Radio Frequency Identification device).

* * * * *